(12) United States Patent
Zhou et al.

(10) Patent No.: US 10,106,868 B2
(45) Date of Patent: Oct. 23, 2018

(54) PROCESS FOR EXTRACTING NOBLE METALS FROM ANODE SLIME

(71) Applicant: Yanggu Xiangguang Copper Co., Ltd., Shandong (CN)

(72) Inventors: Songlin Zhou, Shandong (CN); Xiangtian Xie, Shandong (CN)

(73) Assignee: YANGGU XIANGGUANG COPPER CO., LTD., Shandong (CN)

( * ) Notice: Subject to any disclaimer, the term of this patent is extended or adjusted under 35 U.S.C. 154(b) by 177 days.

(21) Appl. No.: 15/184,108

(22) Filed: Jun. 16, 2016

(65) Prior Publication Data

US 2017/0145541 A1    May 25, 2017

(30) Foreign Application Priority Data

Nov. 20, 2015   (CN) .......................... 2015 1 0816989

(51) Int. Cl.
  *C22B 1/00*    (2006.01)
  *C22B 5/02*    (2006.01)
  (Continued)

(52) U.S. Cl.
  CPC ............ *C22B 11/042* (2013.01); *C22B 1/005* (2013.01); *C22B 5/02* (2013.01); *C22B 7/00* (2013.01);
  (Continued)

(58) Field of Classification Search
  CPC .... C22B 1/00; C22B 5/02; C22B 7/00; C22B 11/042
  See application file for complete search history.

(56) References Cited

U.S. PATENT DOCUMENTS

| 3,127,244 A * | 3/1964 | Elkin et al. ........... C01L 319/00 423/41 |
| 4,094,668 A | 6/1978 | Yannopoulos |

(Continued)

FOREIGN PATENT DOCUMENTS

| CA | 101831551 A | 9/2010 |
| CL | 2007003238 A1 | 4/2008 |

(Continued)

OTHER PUBLICATIONS

CN 102925703 machine translation of the description (Year: 2014).*

(Continued)

*Primary Examiner* — George Wyszomierski
*Assistant Examiner* — Tima M McGuthry-Banks
(74) *Attorney, Agent, or Firm* — Schwabe Williamson & Wyatt, PC

(57) ABSTRACT

The present invention provides a process for extracting noble metals from anode slime, comprising: mixing sodium carbonate, quartz and coke powder and impurity-removed anode slime, and subjecting the mixture to smelting and converting to obtain alloys of noble metals. The present invention avoids problem of lead pollution by using metallic bismuth to collect noble metals; meanwhile, metallic bismuth has low melting point, high specific gravity, and formation heat of bismuth oxide of 45.6 kcal/g atomic oxygen, thus it is easy to be reduced and the reduction temperature is low, which are beneficial for saving energy consumption and reduction time; the much smaller amounts of copper, nickel, antimony and arsenic entering noble bismuth in a slightly reductive smelting atmosphere than those entering noble lead make the converting of noble bismuth become simple, thereby decreasing smelting time and increasing the direct recovery rate of noble metals in anode slime.

9 Claims, 1 Drawing Sheet

(51) Int. Cl.
  *C22B 7/00* (2006.01)
  *C22B 11/00* (2006.01)
  *C22B 3/00* (2006.01)
  *C22B 11/02* (2006.01)

(52) U.S. Cl.
  CPC ............ *C22B 7/007* (2013.01); *C22B 11/023* (2013.01); *Y02P 10/212* (2015.11)

(56) References Cited

U.S. PATENT DOCUMENTS

| | | | |
|---|---|---|---|
| 4,581,064 A | | 4/1986 | Morrison et al. |
| 4,892,631 A | * | 1/1990 | White ........................ C22B 9/20 205/565 |
| 5,108,721 A | * | 4/1992 | Baboudjian ............ C22B 23/043 204/DIG. 13 |
| 2009/0120236 A1 | * | 5/2009 | Lagos .................... C22B 9/003 75/10.14 |
| 2014/0008238 A1 | * | 1/2014 | Zhou ........................ C25C 3/34 205/367 |
| 2015/0053572 A1 | * | 2/2015 | Subbaiah ................ C22B 7/007 205/615 |

FOREIGN PATENT DOCUMENTS

| | | | |
|---|---|---|---|
| CN | 1199780 C | * | 11/2000 |
| CN | 102690955 B | * | 7/2013 |
| CN | 103266225 A | | 8/2013 |
| CN | 103397191 A | * | 11/2013 |
| CN | 103397191 A | | 11/2013 |
| CN | 102925703 B | * | 4/2014 |
| CN | 103993180 A | | 8/2014 |

OTHER PUBLICATIONS

CN-103397191 machine translation of the description (Year: 2013).*
CN-102690955 machine translation of the description (Year: 2013).*
CN-1199780 machine translation of the description (Year: 2000).*
Chinese Patent Application No. 201510816989.8 Office Action dated Aug. 5, 2016.
Canadian Patent Application 2933448 Office Action dated Apr. 26, 2017, 5 pages.
Chilean Office Action for Application No. 2016-001582 dated Dec. 19, 2017; 10 pages including English summary.

* cited by examiner

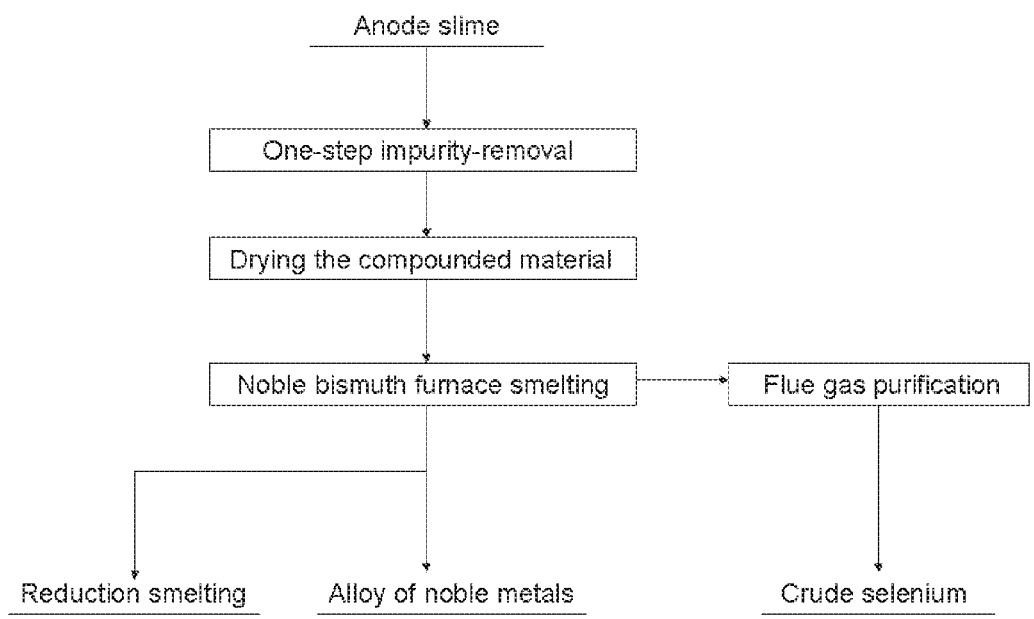

US 10,106,868 B2

PROCESS FOR EXTRACTING NOBLE METALS FROM ANODE SLIME

CROSS-REFERENCE TO RELATED PATENT APPLICATIONS

This application claims the benefit of priority to Chinese Patent Application No. 201510816989.8, filed on Nov. 20, 2015, hereby incorporated by reference in its entirety.

FIELD OF THE INVENTION

The present invention belongs to the field of noble metal technology, and in particular relates to a process for extracting noble metals from anode slime.

BACKGROUND OF THE INVENTION

Rare and noble metal resources in China are extremely scarce, comprising only 0.48% of global reserves. Consequently, the technology for comprehensive utilization of rare and noble metals is one of the key technologies that support the development of high-tech industries in China such as national defense and military, aeronautics and astronautics, new energy sources, information, environmental protection and the like.

Rare and noble elements, which have low reserves and are extremely scattered under natural conditions, are not worth being extracted directly from raw ores. However, since scattered rare and noble metals are mostly associated with minerals of nonferrous metals such as copper, lead, zinc and the like, their deep and comprehensive recovery from byproducts, especially anode slime, of nonferrous metal industry is an important approach to the development of rare and noble metals at home and abroad.

Anode slime is the sediment produced at the bottom of an electrolytic tank during industrial electrolysis and an electrolytic byproduct comprising noble metals and recoverable valuable metals.

With the components in anode slime fluctuating considerably, in general the total content of main elements such as gold, silver, lead, copper, antimony, arsenic, bismuth and so on reaches 70% or higher. Which process is ultimately employed for treating the anode slime is selected depending on specific circumstances such as the production scale, the site and the capacity turnover condition of an enterprise, as well as the components in the anode slime. Currently, processes for treating copper anode slime mainly comprise: (1) pyrometallurgical process; (2) hydrometallurgical process; and (3) pyro-hydrometallurgical combined process.

The specific process procedure of hydrometallurgical process comprises: selenium distillation by sulfatizing roasting, —copper extraction with a diluted acid—gold extraction by chlorination—silver extraction with sodium sulfite—gold and silver electrolysis. The specific process procedure of pyrometallurgical process comprises: pressure leaching of copper and tellurium—pyrometallurgical smelting—pyrometallurgical converting—silver electrolysis—gold extraction through treating silver anode slime. Currently, a relatively advanced process for treating anode slime in the world is the process in ronnskar smelter, Sweden, wherein the overall yield of finished gold and silver from anode slime are 98.5% and 98.5%, respectively. Most smelters in China use pyrometallurgical process or pyro-hydrometallurgical combined process.

Regardless of being domestic or overseas, currently, both pyrometallurgical process and pyro-hydrometallurgical combined process for treating anode slime comprise enriching gold and silver in anode slime by using lead, and smelting a noble lead after the noble lead is formed; meanwhile, reduction smelting and oxidation converting are mostly carried out in two metallurgical furnaces, leading to a long smelting time, a large amount of returned material and serious overstock of gold and silver. Meanwhile, the high toxicity of both lead and lead compounds causes great hazards to the environment and operators.

SUMMARY OF THE INVENTION

In view of this, the technical problems to be solved by the present invention is to provide a process for extracting noble metals from an anode slime, and the process provided according to the present invention avoids the pollution of metallic lead, causes a short smelting time, saves energy consumption, and achieves high yields of noble metals.

The present invention provides a process for extracting noble metals from an anode slime, comprising the steps of:
  mixing sodium carbonate, quartz and coke powder and impurity-removed anode slime, and subjecting the mixture to smelting and converting to obtain alloys of noble metals.

Preferably, the anode slime comprises 5-25 wt % of Bi.
Preferably, the anode slime is selected from copper anode slime and/or lead anode slime.
Preferably, the copper anode slime comprises:
  0.1-1 wt % of Au;
  3-15 wt % of Ag;
  1.5-8 wt % of Se;
  8-16 wt % of Cu;
  1-8 wt % of As;
  0.5-2.5 wt % of Sb;
  5-12 wt % of Pb;
  0.2-2 wt % of Te;
  8-20 wt % of Bi; and
  non-metallic impurities as the balance;
  and the lead anode slime comprises:
  0.05-0.8 wt % of Au;
  5-15 wt % of Ag;
  0.5-5 wt % of Se;
  0-2.0 wt % of Cu;
  1-10 wt % of As;
  10-25 wt % of Sb;
  5-15 wt % of Pb;
  0.1-2 wt % of Te;
  10-20 wt % of Bi; and
  non-metallic impurities as the balance.

Preferably, a mass ratio of sodium carbonate, quartz, coke powder and impurity-removed anode slime is (6~10):(5~8):(1~3):100.

Preferably, the smelting temperature is 900-950° C., and the smelting time is 2-4 h.

Preferably, the converting comprises a primary converting and a secondary converting.

In the primary converting, a flow rate of enriched oxygen is 500-700 Nm³/h, a concentration of the enriched oxygen is 15-20%, a rotating speed of the furnace body is 10-12 r/min, a melt temperature in the furnace is 1150-1200° C., and a converting time is 4-5 h.

In the secondary converting, a flow rate of enriched oxygen is 600-750 Nm³/h, a concentration of the enriched oxygen is 25-35%, a rotating speed of the furnace body is 15-16 r/min, a melt temperature in the furnace is 1200-1250° C., and a converting time is 2-3 h;

Preferably, the method for removing impurities in the anode slime comprises:
a) mixing the anode slime with water and concentrated sulfuric acid to obtain a pressure-leach liquor; and
b) performing a solid-liquid separation after the pressure leaching solution is subjected to a two-stage oxygen pressure continuous leaching, to obtain the impurity-removed anode slime.

Preferably, the first stage oxygen pressure leaching in the two-stage oxygen pressure continuous leaching has a pressure of 0.8-0.9 MPa and a temperature of 150-160° C.; and the second stage oxygen pressure leaching in the two-stage oxygen pressure continuous leaching has a pressure of 1.0-1.1 MPa and a temperature of 140-150° C.

Preferably, purifying the flue gas discharged from the smelting and the converting is also included.

Compared with the prior art, the present invention provides a process for extracting noble metals from anode slime, comprising the steps of: mixing sodium carbonate, quartz and coke powder and impurity-removed anode slime, and subjecting the mixture to smelting and converting to obtain alloys of noble metals. The present invention avoids the problem of lead pollution by using metallic bismuth to collect noble metals; meanwhile, metallic bismuth has a low melting point, a high specific gravity, and a formation heat of bismuth oxide of 45.6 kcal/g atomic oxygen, thus it is easy to be reduced and the reduction temperature is low, which are beneficial for saving energy consumption and reduction time; the much smaller amounts of copper, nickel, antimony and arsenic that enter noble bismuth in a slightly reductive smelting atmosphere than those that enter noble lead make the converting of noble bismuth become simple, thereby decreasing smelting time and increasing the direct recovery rate of noble metals in anode slime. Additionally, the technique for collecting noble metals in anode slime with bismuth provided according to the present invention may implement reduction smelting and oxidation converting in one closed metallurgical furnace.

The results show that in the process for extracting noble metals from anode slime provided according to the present invention, the direct recovery rate of gold is ≥92%, the direct recovery rate of silver is ≥92%, the recovery rate of gold is ≥99.5% and the recovery rate of silver is ≥99.5%.

DESCRIPTION OF THE DRAWINGS

FIG. 1 is a process flowchart for extracting noble metals from anode slime according to the present invention.

DETAILED DESCRIPTION

The present invention provides a process for extracting noble metals from anode slime, comprising the steps of:
mixing sodium carbonate, quartz and coke powder and impurity-removed anode slime, and subjecting the mixture to smelting and converting to obtain alloys of noble metals.

In the present invention, after mixing the impurity-removed anode slime, sodium carbonate, quartz and coke powder, smelting is carried out.

Among these, the method for removing impurities from the anode slime is not particularly limited in the present invention, as long as it is a method for removing impurities from anode slime well known by those skilled in the art. In the present invention, the impurities are preferably removed according to the following method:
a) mixing the anode slime with water and concentrated sulfuric acid to obtain a pressure-leach liquor; and
b) performing a solid-liquid separation after the pressure leaching solution is subjected to a two-stage oxygen pressure continuous leaching, to obtain the impurity-removed anode slime.

In the present invention, when the impurities are removed from anode slime, firstly the anode slime is mixed with water and concentrated sulfuric acid to obtain a pressure leaching solution, wherein a mass ratio of anode slime, water and concentrated sulfuric acid is (3-3.5):4:1.

In the present invention, noble metals are collected with bismuth using anode slime as a raw material, wherein the anode slime comprises preferably 5-25 wt % of Bi, more preferably 8-20 wt % of Bi. The anode slime is preferably copper anode slime and/or lead anode slime.

Preferably, the copper anode slime comprises: 0.1-1 wt % of Au; 3-15 wt % of Ag; 1.5-8 wt % of Se; 8-16 wt % of Cu; 1-8 wt % of As; 0.5-2.5 wt % of Sb; 5-12 wt % of Pb; 0.2-2 wt % of Te; 8-20 wt % of Bi; and non-metallic impurities as the balance.

More preferably, the copper anode slime comprises: 0.3-0.8 wt % of Au; 5-10 wt % of Ag; 2-6 wt % of Se; 10-15 wt % of Cu; 3-6 wt % of As; 1.0-2.0 wt % of Sb; 7-10 wt % of Pb; 0.5-1.5 wt % of Te; 10-18 wt % of Bi; and non-metallic impurities as the balance.

Preferably, the lead anode slime comprises: 0.05-0.8 wt % of Au; 5-15 wt % of Ag; 0.5-5 wt % of Se; 0-2.0 wt % of Cu; 1-10 wt % of As; 10-25 wt % of Sb; 5-15 wt % of Pb; 0.1-2 wt % of Te; 10-20 wt % of Bi; and non-metallic impurities as the balance.

More preferably, the lead anode slime comprises: 0.2-0.6 wt % of Au; 7-12 wt % of Ag; 1-4 wt % of Se; 0.5-1.5 wt % of Cu; 2-8 wt % of As; 15-20 wt % of Sb; 7-12 wt % of Pb; 0.5-1.5 wt % of Te; 12-18 wt % of Bi; and non-metallic impurities as the balance.

In the present invention, as the concentrated sulfuric acid, a sulfuric acid having a mass concentration above 98 wt % is preferably used.

After the configuration of the pressure-leach liquor is completed, the pressure-leach liquor is pumped into an autoclave to be treated by a two-stage oxygen pressure continuous leaching. Preferably, the first stage oxygen pressure leaching in the two-stage oxygen pressure continuous leaching has a pressure of 0.8-0.9 MPa and a temperature of 150-160° C.; and the second stage oxygen pressure leaching in the two-stage oxygen pressure continuous leaching has a pressure of 1.0-1.1 MPa and a temperature of 140-150° C.

After the pressure-leach liquor is treated by the two-stage oxygen pressure continuous leaching, most of the impurities such as copper, tellurium and arsenic in the anode slime shift from the slag phase into a liquid phase, and a slurry after the reaction is pumped into a pressure filter to carry out a solid/liquid separation, resulting in impurity-removed anode slime. Copper and tellurium are further recovered from the filtrate.

The impurity-removed anode slime is preferably dried prior to smelting, and the drying is preferably carried out in a dryer. The dried impurity-removed anode slime has a moisture content of 1-3 wt %.

After the drying is completed, the impurity-removed anode slime is mixed and compounded with sodium carbonate, quartz and coke powder to obtain a mixed material, wherein a mass ratio of sodium carbonate, quartz, coke powder and anode slime is preferably (6-10):(5-8):(1-3):100, and more preferably (7-9):(6a-7):(1.5-2.5):100.

In the present invention, the obtained mixed material is smelted with a main purpose to enrich gold, silver, platinum and palladium in the impurity-removed anode slime to form alloys of noble metals with bismuth or an intermetallic compound of noble metals with bismuth, such that the impurities are removed by entering the slag or volatilizing into the flue dust, achieving the purpose of preliminarily separating gold, silver, platinum and palladium from impurities and being ready for further separating the noble metals from impurities.

In the present invention, the bismuth in the anode slime comes from bismuth which is associated with raw ores, and mainly exists in the form of bismuth oxides which is reduced under a reductive atmosphere to obtain metallic bismuth that enters a bismuth solution and forms a multi-metal alloy. The specific reaction is represented by formula (I):

$$2Bi_2O_3 + 3C = 4Bi + 3CO_2 \quad \text{formula (I)};$$

Bismuth melt is a good collector for noble metals such as gold, silver, platinum, palladium and the like. Since bismuth, gold and silver all have a relatively high specific gravity, in the smelting process bismuth and particles of gold and silver together form a Bi(Au+Ag) alloy and deposit at the bottom of the furnace; bismuth alloys have a relatively low smelting point, and meanwhile bismuth in a molten state can dissolve gold and silver infinitely, thus gold and silver are both enriched into a noble bismuth solution.

Noble metals can form a series of alloys or intermetallic compounds with bismuth at a high temperature, comprising: one or more of AuBi alloy or intermetallic compound (240° C.), IrBi alloy or intermetallic compound (in which 0.7-1.0 wt % of Ir is contained, 260° C.), $Bi_3Pd_2$ alloy or intermetallic compound, $Bi_2Pt$ alloy or intermetallic compound, $Bi_4Rh$ alloy or intermetallic compound, BiRu alloy or intermetallic compound (in which 10-20 wt % of Ru is contained), and BiOs alloy or intermetallic compound (in which 10-20 wt % of Os is contained), and the above alloys or intermetallic compounds can be dissolved in metallic bismuth.

In the present invention, the method for the smelting is not particularly limited, as long as it is a method for smelting well known by those skilled in the art. In the present invention, the smelting is preferably carried out according to the following method, comprising:

activating a combustion burner; shutting off the combustion burner after the temperature in the rotary furnace rises to 900-950° C.; starting feeding operation by adding the compounded mixed material into the rotary furnace; activating the combustion burner after the feeding is completed; and increasing the temperature for melting the material with the melting temperature controlled at 1050-1100° C. After the melting is completed, the materials in the furnace are all transformed into molten liquid. The smelting is started and the melt temperature in the furnace during the smelting process is 900-950° C. and maintained for 2-4 h. After the melting is completed, the slag is sampled. If the silver comprised in the slag sample is less than 0.2 wt %, the slag-discharging operation is started.

In the present invention, the chemical reactions shown below occur in the rotary furnace during the process of reduction smelting:

$$2Bi_2O_3 + 3C = 4Bi + 3CO_2$$

$$Bi + Ag + Au + Pt + Pd = Bi(Au+Ag+Pt+Pd)$$

After the smelting is completed, the reaction products are mixed with quartz sand, and then subjected to converting. During the converting process, a mass ratio of quartz and reaction products is preferably (2-5):100, and more preferably (3-4):100.

In the present invention, the method for the converting is not particularly limited, as long as it is a method for converting well known by those skilled in the art.

In the present invention, preferably two converting operations are carried out, comprising a primary converting and a secondary converting;

wherein in the primary converting, the flow rate of enriched oxygen is preferably 500-700 $Nm^3/h$, and more preferably 550-650 $Nm^3/h$; the volume concentration of the oxygen is preferably 20-22%, and more preferably 20-21%; the rotating speed of the furnace body is preferably 10-12 r/min; the melt temperature in the furnace is preferably 1150-1200° C., and more preferably 1170-1190° C.; and the time for the primary converting is preferably 4-5 h.

After the primary converting operation is completed, the slag layer on the surface of the alloy melt should be discharged. Taking samples of the slag and the metals from the furnace timely and delivering them for analysis to know the information about the Ag contained in the converting slag and the impurities contained in the alloy melt are beneficial to the secondary converting operation.

In the secondary converting, the flow rate of enriched oxygen is preferably 600-750 $Nm^3/h$, and more preferably 650-700 $Nm^3/h$; the volume concentration of the oxygen is preferably 25-35%, and more preferably 27-32%; the rotating speed of the furnace body is preferably 15-16 r/min; the melt temperature in the furnace is preferably 1200-1250° C., and more preferably 1220-1240° C.; and the time for the secondary converting is preferably 2-3 h. After the secondary converting is completed, noble metal alloys are obtained.

During the process of the secondary converting operation, most of Se and Te in the melt are oxidized to $SeO_2$ and $TeO_2$, respectively, which vaporize into the flue gas, and part of Pb, Cu, Sb, Bi and Te are strongly oxidized and enter the slag. Until the end of the secondary converting, samples of the slag and the alloys are taken timely and delivered for test and analysis; if the test results of the alloy sample show that the alloy comprises (Au+Ag)≥98%, Cu in the impurities <2%, and Pb, Se, Te, Bi and Sb each ≤0.01%, then it is indicated that the end point of the converting has been reached, and the alloy melt of gold and silver in the furnace can be ready to be taken out of the furnace and cast into a gold-silver alloy anode, which is delivered to an electrolytic process.

The process for extracting noble metals from anode slime provided according to the present invention further comprises purifying the flue gas discharged during the smelting and the converting. The flue gas discharged during the processes of smelting and converting enters a wet electric demister after being cooled, washed and dedusted through a two-stage "vertical simple venturi+counterflow relay washer", and then is washed with a dilute alkaline solution through a washing tower to remove harmful components and discharged after reaching the standard. The selenium dioxide in the flue gas enters the washing solution in the two-stage "vertical simple venturi+counterflow relay washer". After the washing solution is pressure filtered, the filtrate is reduced by introducing $SO_2$ into it and filtered to obtain crude selenium (Se≥95%), and after the selenium is precipitated the filtrate is delivered to wastewater treatment.

The process procedure for extracting noble metals from anode slime provided according to the present invention is given in FIG. 1, which shows a process flowchart for extracting noble metals from anode slime according to the present invention. Particularly, at first, anode slime is subjected to a one-step impurity-removal process to produce impurity-removed anode slime, and the impurity-removed anode slime after being dried and compounded is put into a noble bismuth furnace and smelted to obtain alloys of noble metals; and crude selenium is obtained after the flue gas generated during the smelting process is purified.

The technical specifications in Table 1 may be met by using the process for extracting noble metals from anode slime provided according to the present invention; and Table 1 gives the technical specifications of the process for extracting noble metals from anode slime provided according to the present invention.

TABLE 1

Technical specifications of the process for extracting noble metals from anode slime provided according to the present invention

| Name of the technical specification | Unit | Economic technical specification |
|---|---|---|
| Direct recovery rate of gold | % | ≥92 |
| Direct recovery rate of silver | % | ≥92 |
| Recovery rate of gold | % | ≥99.5 |
| Recovery rate of silver | % | ≥99.5 |
| Silver contained in the slag | % | <0.2 |
| Gold contained in the slag | % | <0.01% |
| Unit consumption of natural gas | Nm³/t anode slime | 160 |
| Time for reduction smelting | h | 12 |
| Time for enriched oxygen converting of noble bismuth | h | 8 |

The present invention avoids the problem of lead pollution by using metallic bismuth to collect noble metals; meanwhile, metallic bismuth has a low melting point, a high specific gravity, and a formation heat of bismuth oxide of 45.6 kcal/g atomic oxygen, thus it is easy to be reduced and the reduction temperature is low, which are beneficial for saving energy consumption and reduction time; the much smaller amounts of copper, nickel, antimony and arsenic that enter noble bismuth in a slightly reductive smelting atmosphere than those that enter noble lead make the converting of noble bismuth become simple, thereby decreasing smelting time and increasing the direct recovery rate of noble metals in anode slime. Additionally, the technique for collecting noble metals in anode slime with bismuth provided according to the present invention may implement reduction smelting and oxidation converting in one closed metallurgical furnace.

The results show that in the process for extracting noble metals from anode slime provided according to the present invention, the direct recovery rate of gold is ≥92%, the direct recovery rate of silver is ≥92%, the recovery rate of gold is ≥99.5% and the recovery rate of silver is ≥99.5%.

To further understand the present invention, the process for extracting noble metals from anode slime provided according to the present invention is illustrated in combination with examples below, but the protection scope of the present invention is not limited by the following examples.

EXAMPLE 1

Copper anode slime was selected and used for extracting noble metals, wherein the components of the copper anode slime selected and used in this example are shown in Table 2, which is a table of the components in the copper anode slime.

TABLE 2

Test components in the copper anode slime

| Element | | | | | | | | | |
|---|---|---|---|---|---|---|---|---|---|
| | Au | Ag | Se | Cu | As | Sb | Pb | Te | Bi | Impurities |
| % | 0.55 | 6.000 | 4.5 | 12 | 4.7 | 2 | 8.5 | 2 | 15 | Balance |

1. One-step Removal of Impurities from the Copper Anode Slime

The copper anode slime was added to a compounding tank, and then water and concentrated sulfuric acid were added to formulate a pressure leaching solution, wherein a mass ratio of water, concentrated sulfuric acid and copper anode slime was 3:4:1; after being formulated the pressure leaching solution was pumped into an autoclave for a two-stage oxygen pressure continuous leaching, with the first stage oxygen pressure leaching controlled under 0.9 MPa at a temperature of 150° C. and the second stage oxygen pressure leaching controlled under 1.0 MPa at a temperature of 150° C. After the reaction was complete, the slurry was pumped into a pressure filter to carry out a solid/liquid separation, and copper and tellurium were further recovered from the filtrate. The contents of the main components in the impurity-removed anode slime are shown in Table 3, which gives the contents of the main components in the impurity-removed anode slime.

The impurity-removed anode slime was delivered to a dryer and dried to a moisture content of 1.5 wt %.

TABLE 3

Contents of the main components in the impurity-removed anode slime

| Cu (%) | Au (g/t) | Ag (%) | SiO$_2$ (%) | Sb (%) | Bi (%) | As (%) | Pb (%) | Se (%) | Te (%) |
|---|---|---|---|---|---|---|---|---|---|
| 0.38 | 3577 | 7.44 | 0.44 | 1.18 | 19.82 | 3.49 | 12.64 | 5.03 | 0.42 |

2. Low-temperature Reduction Smelting of the Impurity-removed Anode Slime to Form Noble Bismuth After the dried impurity-removed anode slime was compounded with sodium carbonate, quartz and coke powder in a mass ratio of 100:6:8:1, the mixed material was added to a hopper by an automatic feeding system, and then added to a noble bismuth furnace (rotary furnace) in a set amount for smelting. The smelting process was as follows:

at first, a combustion burner was activated to increase the temperature in the furnace (empty furnace) to 900° C.; feeding operation was started and the compounded mixed material was added into the rotary furnace; after the feeding was complete, the combustion burner was activated to increase the temperature for melting the material with the melting temperature controlled at 1050° C. After the melting was complete, the materials in the furnace were all transformed into molten liquid.

Throughout the smelting process, the melt temperature in the furnace was maintained at 900° C. until the operation was complete. The slag was sampled after 2 h, and if the silver contained in the slag was less than 0.2%, slag-discharging operation was started to obtain a noble bismuth sample, which was an alloy of noble metals with bismuth or an intermetallic compound of noble metals with bismuth. The components in the obtained noble bismuth sample are shown in Table 4, which is a table of the contents of the components in the noble bismuth sample.

TABLE 4

Contents of the components in the noble bismuth sample

| Cu (%) | Au (%) | Ag (%) | Sb (%) | Bi (%) | Pb (%) | Se (%) | Te (%) |
|---|---|---|---|---|---|---|---|
| 0.64 | 2.57 | 17.86 | <0.01 | 67.73 | 5.45 | 5.10 | 0.57 |

3. Enriched Oxygen Converting of the Noble Bismuth Sample to Form an Alloy of Gold and Silver After the smelting operation was complete, the noble bismuth sample was taken for test and analysis with the addition of 80 kg of quartz. After the last batch of the smelting slag was discharged, a burner was inserted for heating to increase the temperature, and a converting nozzle was inserted to start the converting operation. The converting was divided into a primary converting and a secondary converting. The specific parameters of the converting were as follows:

(1) the primary converting
flow rate of enriched oxygen: 500 Nm³/h
enriched oxygen concentration: 20%
rotating speed of furnace body: 10 r/min
melt temperature control in the furnace: 1150° C.
converting time control: 4 h Most of Bi and part of Cu, Sb, Pb and Te in the melt could be strongly oxidized and enter the slag through the primary converting.

When the primary converting operation was complete, the slag layer on the surface of the alloy melt should be discharged. Taking samples of the slag and the metals from the furnace timely and delivering them for analysis to know the information about the Ag contained in the converting slag and the impurities contained in the alloy melt were beneficial to the next converting operation.

(2) the secondary converting
flow rate of enriched oxygen: 750 Nm³/h
enriched oxygen concentration: 25%
rotating speed of furnace body: 15 r/min
melt temperature control in the furnace: 1200° C.
converting time control: 3 h, number of times the converting gun was checked: 3 times/h During the process of the secondary converting operation, most of Se and Te in the melt were oxidized into $SeO_2$ and $TeO_2$, respectively, which vaporized into the flue gas, and part of Pb, Cu, Sb, Bi and Te were strongly oxidized and entered the slag. Until the end of the converting operation, samples of the slag and the alloys were taken timely and delivered for tests and analysis; if the test results of the alloy sample showed that the alloy comprised (Au+Ag)≥98%, Cu in the impurities <2%, and Pb, Se, Te, Bi and Sb each ≤0.01%, then it was indicated that the end point of the converting operation had been reached, and the alloy melt of gold and silver in the furnace could be ready to be taken out of the furnace and cast into a gold-silver alloy anode, which was delivered to a silver electrolysis process. The components in the alloy of gold and silver are shown in Table 5.

TABLE 5

Components in the alloy of gold and silver

| Cu (%) | Au (%) | Ag (%) | Sb (%) | Bi (%) | Pb (%) | Se (%) | Te (%) |
|---|---|---|---|---|---|---|---|
| 1.65 | 7.57 | 91.86 | <0.001 | <0.001 | <0.001 | <0.001 | <0.001 |

4. Purification of the Flue Gas

The flue gas discharged during the processes of smelting and converting entered a wet electric demister after being cooled, washed and dedusted through a two-stage "vertical simple venturi+counterflow relay washer", and then was washed with a dilute alkaline solution through a washing tower to remove harmful components and discharged after reaching the standard. The selenium dioxide in the flue gas entered the washing solution in the two-stage "vertical simple venturi+counterflow relay washer". After the washing solution was pressure filtered, the filtrate was reduced by introducing $SO_2$ into it and filtered to obtain crude selenium (Se content 95 wt %), and after the selenium was precipitated the filtrate was delivered to wastewater treatment.

The process technical specifications during the process for extracting noble metals from anode slime in this example are shown in Table 6.

TABLE 6

Process technical specifications

| Name of the technical specification | Unit | Economic technical specification |
|---|---|---|
| Direct recovery rate of gold | % | 92.5 |
| Direct recovery rate of silver | % | 93.1 |
| Recovery rate of gold | % | 99.52 |
| Recovery rate of silver | % | 99.53 |
| Silver contained in the slag | % | 0.19 |
| Gold contained in the slag | % | 0.008% |
| Unit consumption of natural gas | Nm³/t anode slime | 155 |
| Time for reduction smelting | h | 11.5 |
| Time for enriched oxygen converting of noble bismuth | h | 7 |

EXAMPLE 2

Lead anode slime was selected and used for extracting noble metals, wherein the components in the lead anode slime selected and used in this example are shown in Table 7, which is a table of the components in the lead anode slime.

TABLE 7

Components in the lead anode slime

| | Element | | | | | | | |
|---|---|---|---|---|---|---|---|---|
| | Au | Ag | Se | Cu | As | Te | Sb | Pb | Bi |
| % | 0.35 | 10.00 | 2.5 | 5.0 | 6.7 | 0.5 | 20 | 10 | 18 |

1. One-step Removal of Impurities from the Lead Anode Slime

The lead anode slime was added to a compounding tank, and then water and concentrated sulfuric acid were added to formulate a pressure leaching solution, wherein a mass ratio of water, concentrated sulfuric acid and lead anode slime was 3:4:1; after being formulated the pressure leaching solution was pumped into an autoclave for a two-stage oxygen pressure continuous leaching, with the first stage oxygen pressure leaching controlled under 0.8 MPa at a temperature of 150° C. and the second stage oxygen pressure leaching controlled under 1.0 MPa at a temperature of 140° C. After the reaction was complete the slurry was pumped into a pressure filter to subject to a solid/liquid separation, and copper and tellurium were further recovered from the filtrate. The contents of the main components in the impurity-removed anode slime are shown in Table 8, which gives the contents of the main components in the impurity-removed anode slime.

The impurity-removed anode slime was delivered to a dryer and dried to a moisture content of 1.5 wt %.

TABLE 8

Contents of the main components in the impurity-removed anode slime

| Cu (%) | Au (g/t) | Ag (%) | SiO$_2$ (%) | Sb (%) | Bi (%) | As (%) | Pb (%) | Se (%) | Te (%) |
|---|---|---|---|---|---|---|---|---|---|
| 0.2 | 4365 | 12.1 | 0.2 | 23.1 | 21.5 | 5.4 | 12.4 | 2.3 | 0.21 |

2. Low-temperature Reduction Smelting of Lead Anode Slime to Form Noble Bismuth

The dried impurity-removed lead anode slime was delivered to a dryer and dried to a moisture content of 2 wt %. The dried lead anode slime was compounded with sodium carbonate, quartz and coke powder in a compounding ratio of 100:8:6:2, and the mixed material was added to a hopper by an automatic feeding system, and then added to a noble bismuth furnace (rotary furnace) in a set amount for smelting.

The smelting process was as follows:

at first, a combustion burner was activated to increase the temperature in the furnace (empty furnace) to 900° C.; feeding operation was started and the compounded mixed material was added into the rotary furnace; after the feeding was complete the combustion burner was activated to increase the temperature for melting the material with the melting temperature controlled at 1050° C. After the melting was complete, the materials in the furnace were all transformed into molten liquid.

Throughout the smelting process, the melt temperature in the furnace was maintained at 950° C. until the operation was complete. The slag was sampled after 2 h, and if the silver comprised in the slag was less than 0.2%, slag-discharging operation was started to obtain a noble bismuth sample, which was an alloy of noble metals with bismuth or an intermetallic compound of noble metals with bismuth. The components in the obtained noble bismuth sample are shown in Table 9, which is a table of the contents of the components in the noble bismuth sample.

TABLE 9

Contents of the components in the noble bismuth sample

| Cu (%) | Au (%) | Ag (%) | Sb (%) | Bi (%) | Pb (%) | Se (%) | Te (%) |
|---|---|---|---|---|---|---|---|
| 0.84 | 1.68 | 27.78 | 1.1 | 62.81 | 4.42 | 2.69 | 0.31 |

3. Enriched Oxygen Converting of the Noble Bismuth to Form an Alloy of Gold and Silver After the smelting operation was complete, a noble bismuth sample was taken for test and analysis with the addition of 80 kg of quartz. After the last batch of the smelting slag was discharged, a burner was inserted for heating to increase the temperature, and a converting nozzle was inserted to start the converting operation. The converting was divided into a primary converting and a secondary converting.

(1) the primary converting
flow rate of enriched oxygen: 600 Nm$^3$/h
enriched oxygen concentration: 22%
rotating speed of furnace body: 11 r/min
melt temperature control in the furnace: 1200° C.
converting time control: 4.5 h Most of Bi and part of Cu, Sb, Pb and Te in the melt could be strongly oxidized and enter the slag through the primary converting.

When the primary converting operation was complete, the slag layer on the surface of the alloy melt should be discharged. Taking samples of the slag and the metals from the furnace timely and delivering them for analysis to know the information about the Ag contained in the converting slag and the impurities contained in the alloy melt were beneficial to the next converting operation.

(2) the secondary converting
flow rate of enriched oxygen: 750 Nm$^3$/h
enriched oxygen concentration: 25%
rotating speed of furnace body: 15 r/min
melt temperature control in the furnace: 1200° C.
converting time control: 3 h, number of times the converting gun was checked: 3 times/h During the process of the secondary converting operation, most of Se and Te in the melt were oxidized into SeO$_2$ and TeO$_2$, respectively, which vaporized into the flue gas, and part of Pb, Cu, Sb, Bi and Te were strongly oxidized and entered the slag. Until the end of the converting operation, samples of the slag and the alloy were taken timely and delivered for test and analysis; if the test results of the alloy sample showed that the alloy comprised (Au+Ag)≥98%, Cu in the impurities <2%, and Pb, Se, Te, Bi and Sb each ≤0.01%, then it was indicated that the end point of the converting operation had been reached, and the alloy melt of gold and silver in the furnace could be ready to be taken out of the furnace and cast into a gold-silver alloy anode, which was delivered to a silver electrolysis process. The components in the alloy of gold and silver are shown in Table 10.

TABLE 10

Components in the alloy of gold and silver

| Cu (%) | Au (%) | Ag (%) | Sb (%) | Bi (%) | Pb (%) | Se (%) | Te (%) |
|---|---|---|---|---|---|---|---|
| 1.86 | 5.46 | 92.92 | <0.001 | <0.001 | <0.001 | <0.001 | <0.001 |

4. Purification of the Flue Gas

The flue gas discharged during the processes of smelting and converting entered a wet electric demister after being cooled, washed and dedusted through a two-stage "vertical simple venturi+counterflow relay washer", and then was washed with a dilute alkaline solution through a washing tower to remove harmful components and discharged after reaching the standard. The selenium dioxide in the flue gas entered the washing solution in the two-stage "vertical simple venturi+counterflow relay washer". After the washing solution was pressure filtered, the filtrate was reduced by introducing SO$_2$ into it and filtered to obtain crude selenium (Se content 96 wt %), and after the selenium was precipitated the filtrate was delivered to wastewater treatment.

The process technical specifications during the process for extracting noble metals from anode slime in this example are shown in Table 11.

TABLE 11

Process technical specifications

| Name of the technical specification | Unit | Economic technical specification |
|---|---|---|
| Direct recovery rate of gold | % | 92.2 |
| Direct recovery rate of silver | % | 92.5 |
| Recovery rate of gold | % | 99.54 |
| Recovery rate of silver | % | 99.53 |
| Silver contained in the slag | % | 0.18 |
| Gold contained in the slag | % | 0.005% |
| Unit consumption of natural gas | Nm³/t anode slime | 148 |
| Time for reduction smelting | h | 11.8 |
| Time for enriched oxygen converting of noble bismuth | h | 7.5 |

EXAMPLE 3

Mixed anode slime of copper anode slime and lead anode slime was selected and used for extracting noble metals, wherein the components in the mixed anode slime selected and used in this example are shown in Table 12 and 13, which are tables of the components in the copper anode slime and the lead anode slime, respectively.

TABLE 12

Components in the copper anode slime

| | Element | | | | | | | | |
|---|---|---|---|---|---|---|---|---|---|
| | Au | Ag | Se | Cu | As | Sb | Pb | Te | Bi |
| % | 0.55 | 6.000 | 4.5 | 9.5 | 4.7 | 2 | 8.5 | 2 | 15 |

TABLE 13

Components in the lead anode slime

| | Element | | | | | | | | |
|---|---|---|---|---|---|---|---|---|---|
| | Au | Ag | Se | Cu | As | Te | Sb | Pb | Bi |
| % | 0.35 | 10.00 | 2.5 | 2.5 | 6.7 | 0.5 | 20 | 10 | 13 |

1. One-step Removal of Impurities from the Mixed Anode Slime

The copper anode slime and the lead anode slime having the above components in a mass ratio of 2:1 were added to a compounding tank, and water, concentrated sulfuric acid and the anode slime were added to the compounding tank in a mass ratio of 3:4:1 to formulate a pressure leaching solution; after being formulated the pressure leaching solution was pumped into an autoclave for a two-stage oxygen pressure continuous leaching, with the first stage oxygen pressure leaching controlled under 0.9 MPa at a temperature of 160° C. and the second stage oxygen pressure leaching controlled under 1.0 MPa at a temperature of 140° C. After the reaction was complete the slurry was pumped into a pressure filter to subject to a solid/liquid separation, and copper and tellurium were further recovered from the filtrate.

After the impurity removal, the copper anode slime and the lead anode slime were delivered to a dryer and dried to a moisture content of 3 wt %.

2. Low-temperature Reduction Smelting of the Impurity-removed Anode Slime to Form Noble Bismuth The dried impurity-removed anode slime was compounded with sodium carbonate, quartz and coke powder in a mass ratio of 100:10:8:3, and the mixed material was added to a hopper by an automatic feeding system, and then added to a noble bismuth furnace (rotary furnace) in a set amount for smelting.

The smelting process was as follows:

at first, a combustion burner was activated to increase the temperature in the furnace (empty furnace) to 900° C.; feeding operation was started and the compounded mixed material was added to the rotary furnace; after the feeding was complete the combustion burner was activated to increase the temperature for melting the material with the melting temperature controlled at 1050° C. After the melting was complete, the materials in the furnace were all transformed into molten liquid.

Throughout the smelting process, the melt temperature in the furnace was maintained at 950° C. until the operation was complete. The slag was sampled after 2 h, and if the silver comprised in the slag was less than 0.2 wt %, slag-discharging operation was started to obtain a noble bismuth sample, which was an alloy of noble metals with bismuth or an intermetallic compound of noble metals with bismuth. The components in the obtained noble bismuth sample are shown in Table 14, which is a table of the contents of the components in the noble bismuth sample.

TABLE 14

Contents of the components in the noble bismuth sample

| Cu (%) | Au (%) | Ag (%) | Sb (%) | Bi (%) | Pb (%) | Se (%) | Te (%) |
|---|---|---|---|---|---|---|---|
| 0.74 | 2.54 | 19.87 | 0.75 | 65.53 | 4.95 | 3.85 | 0.47 |

3. Enriched Oxygen Converting of the Noble Bismuth to Form an Alloy of Gold and Silver After the smelting operation was complete, a noble bismuth sample was taken for test and analysis with the addition of 80 kg of quartz. After the last batch of the smelting slag was discharged, a burner was inserted for heating to increase the temperature, and a converting nozzle was inserted to start the converting operation. The converting was divided into a primary converting and a secondary converting.

(1) the primary converting
flow rate of enriched oxygen: 700 Nm³/h
enriched oxygen concentration: 20%
rotating speed of furnace body: 12 r/min
melt temperature control in the furnace: 1200° C.
converting time control: 5 h Most of Bi and part of Cu, Sb, Pb and Te in the melt could be strongly oxidized and enter the slag through the primary converting.

When the primary converting operation was complete, the slag layer on the surface of the alloy melt should be discharged. Taking samples of the slag and the metals from the furnace timely and delivering them for analysis to know the information about the Ag contained in the converting slag and the impurities contained in the alloy melt were beneficial to the next converting operation.

(2) the secondary converting
flow rate of enriched oxygen: 750 Nm³/h
enriched oxygen concentration: 35%
rotating speed of furnace body: 16 r/min
melt temperature control in the furnace: 1250° C.

converting time control: 3 h, number of times the converting gun was checked: 2 times/h During the process of the secondary converting operation, most of Se and Te in the melt were oxidized into $SeO_2$ and $TeO_2$, respectively, which vaporized into the flue gas, and part of Pb, Cu, Sb, Bi and Te were strongly oxidized and entered the slag. Until the end of the converting operation, samples of the slag and the alloy were taken timely and delivered for tests and analysis; if the test results of the alloy sample showed that the alloy comprised (Au+Ag)≥98%, Cu in the impurities <2%, and Pb, Se, Te, Bi and Sb each≤0.01%, then it was indicated that the end point of the converting operation had been reached, and the alloy melt of gold and silver in the furnace could be ready to be taken out of the furnace and cast into a gold-silver alloy anode, which was delivered to a silver electrolysis process. The components in the alloy of gold and silver are shown in Table 15.

TABLE 15

Components in the alloy of gold and silver

| Cu (%) | Au (%) | Ag (%) | Sb (%) | Bi (%) | Pb (%) | Se (%) | Te (%) |
|---|---|---|---|---|---|---|---|
| 1.75 | 6.85 | 91.83 | <0.001 | <0.001 | <0.001 | <0.001 | <0.001 |

4. Purification of the Flue Gas

The flue gas discharged during the processes of smelting and converting entered a wet electric demister after being cooled, washed and dedusted through a two-stage "vertical simple venturi+counterflow relay washer", and then was washed with a dilute alkaline solution through a washing tower to remove harmful components and discharged after reaching the standard. The selenium dioxide in the flue gas entered the washing solution in the two-stage "vertical simple venturi+counterflow relay washer". After the washing solution was pressure filtered, the filtrate was reduced by introducing $SO_2$ into it and filtered to obtain crude selenium (Se content 94.5 wt %), and after the selenium was precipitated the filtrate was delivered to wastewater treatment.

The process technical specifications during the process for extracting noble metals from anode slime in this example are shown in Table 16.

TABLE 16

Process technical specifications

| Name of the technical specification | Unit | Economic technical specification |
|---|---|---|
| Direct recovery rate of gold | % | 92.1 |
| Direct recovery rate of silver | % | 99.5 |
| Recovery rate of gold | % | 99.53 |
| Recovery rate of silver | % | 99.56 |
| Silver contained in the slag | % | 0.17 |
| Gold contained in the slag | % | 0.006% |
| Unit consumption of natural gas | $Nm^3$/t anode slime | 155 |
| Time for reduction smelting | h | 11.8 |
| Time for enriched oxygen converting of noble bismuth | h | 8 |

What is described above is only preferred embodiments of the present invention. It should be noted that for those of ordinary skill in the art, several improvements and modifications may also be made without departing from principles of the present invention, and these improvements and modifications should also be considered within the protection scope of the present invention.

The invention claimed is:

1. A process for extracting noble metals from anode slime, wherein the process comprises the steps of:
    mixing sodium carbonate, quartz and coke powder and impurity-removed anode slime, and subjecting the mixture to smelting and converting to obtain alloys of noble metals;
    wherein the converting comprises a primary converting and a secondary converting under enriched oxygen and in a rotating furnace;
    in the primary converting, a flow rate of enriched oxygen is 500-700 Nm3/h, a volume concentration of oxygen is 20-22%, a rotating speed of furnace body is 10-12 r/min, a melt temperature in furnace is 1150-1200° C., and a converting time is 4-5 h; and
    in the secondary converting, a flow rate of enriched oxygen is 600-750 Nm3/h, a volume concentration of oxygen is 25-35%, a rotating speed of furnace body is 15-16 r/min, a melt temperature in furnace is 1200-1250° C., and a converting time is 2-3 h.

2. The process according to claim 1, wherein the anode slime comprises 5-25 wt % of Bi.

3. The process according to claim 1, wherein the anode slime is selected from copper anode slime and/or lead anode slime.

4. The process according to claim 3, wherein the copper anode slime comprises:
    0.1-1 wt % of Au;
    3-15 wt % of Ag;
    1.5-8 wt % of Se;
    8-16 wt % of Cu;
    1-8 wt % of As;
    0.5-2.5 wt % of Sb;
    5-12 wt % of Pb;
    0.2-2 wt % of Te;
    8-20 wt % of Bi; and
    nonmetal impurities as the balance; and
    the lead anode slime comprises:
    0.05-0.8 wt % of Au;
    5-15 wt % of Ag;
    0.5-5 wt % of Se;
    0-5.0 wt % of Cu;
    1-10 wt % of As;
    10-25 wt % of Sb;
    5-15 wt % of Pb;
    0.1-2 wt % of Te;
    10-20 wt % of Bi; and
    nonmetal impurities as the balance.

5. The process according to claim 1, wherein a mass ratio of sodium carbonate, quartz, coke powder and impurity-removed anode slime is (6-10):(5-8):(1-3):100.

6. The process according to claim 1, wherein the smelting temperature is 900-950° C., and the smelting time is 2-4 h.

7. The process according to claim 1, wherein the impurity-removed anode slime is obtained by a method comprising:
    a) mixing the anode slime with water and concentrated sulfuric acid to obtain a pressure-leach liquor; and
    b) performing a solid-liquid separation after the pressure-leach liquor is subjected to a two-stage oxygen pressure continuous leaching, to obtain the impurity-removed anode slime.

8. The process according to claim 7, wherein the first stage oxygen pressure leaching in the two-stage oxygen pressure continuous leaching has a pressure of 0.8-0.9 MPa and a temperature of 150-160° C.; and the second stage oxygen pressure leaching in the two-stage oxygen pressure continuous leaching has a pressure of 1.0-1.1 MPa and a temperature of 140-150° C.

9. The process according to claim 1, characterized in further comprising purifying flue gas discharged during the smelting and the converting.

* * * * *